(No Model.) 2 Sheets—Sheet 1.

W. C. AYERS.
GARLIC SEPARATOR.

No. 396,678. Patented Jan. 22, 1889.

Witnesses:
W. Burris,
G. B. Towles,

Inventor:
Wm. C. Ayers
By Jesse J. Yeates.
Attorney.

(No Model.) 2 Sheets—Sheet 2.

W. C. AYERS.
GARLIC SEPARATOR.

No. 396,678. Patented Jan. 22, 1889.

Witnesses:
W. V. Burris
G. B. Towles

Inventor:
Wm. C. Ayers
By Jno. J. Yeates
Attorney

UNITED STATES PATENT OFFICE.

WILLIAM C. AYERS, OF PLYMOUTH, NORTH CAROLINA.

GARLIC-SEPARATOR.

SPECIFICATION forming part of Letters Patent No. 396,678, dated January 22, 1889.

Application filed July 16, 1888. Serial No. 280,137. (No model.)

*To all whom it may concern:*

Be it known that I, WILLIAM C. AYERS, a citizen of the United States, residing at Plymouth, in the county of Washington and State of North Carolina, have invented certain new and useful Improvements in Garlic-Separators; and I do hereby declare the following to be a full, clear, and exact description of the invention, such as will enable others skilled in the art to which it appertains to make and use the same.

This invention relates to grain-separating machines; and it consists in certain improvements in machines for separating garlic, smut, &c., from wheat, as hereinafter described and claimed.

Figure 1:
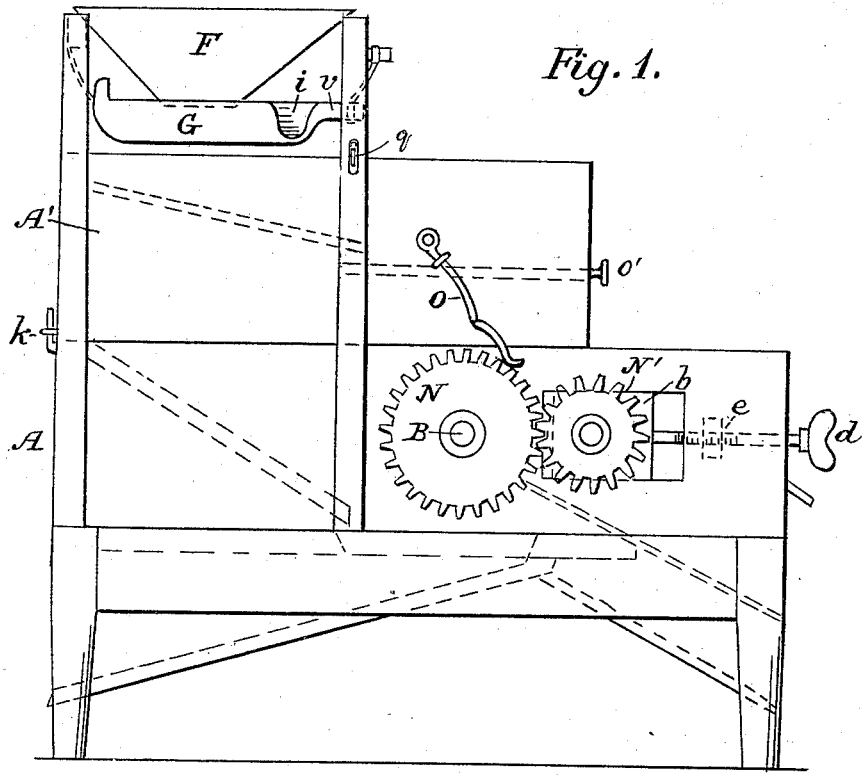
Figure 2:
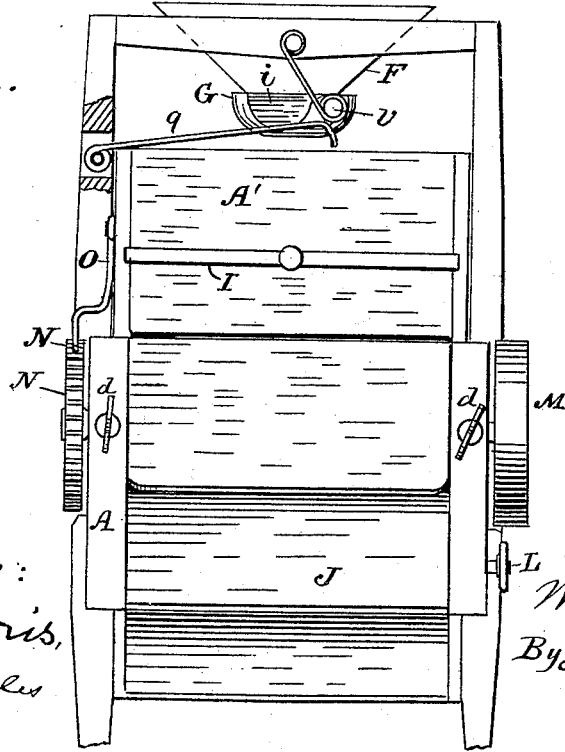
Figure 3:
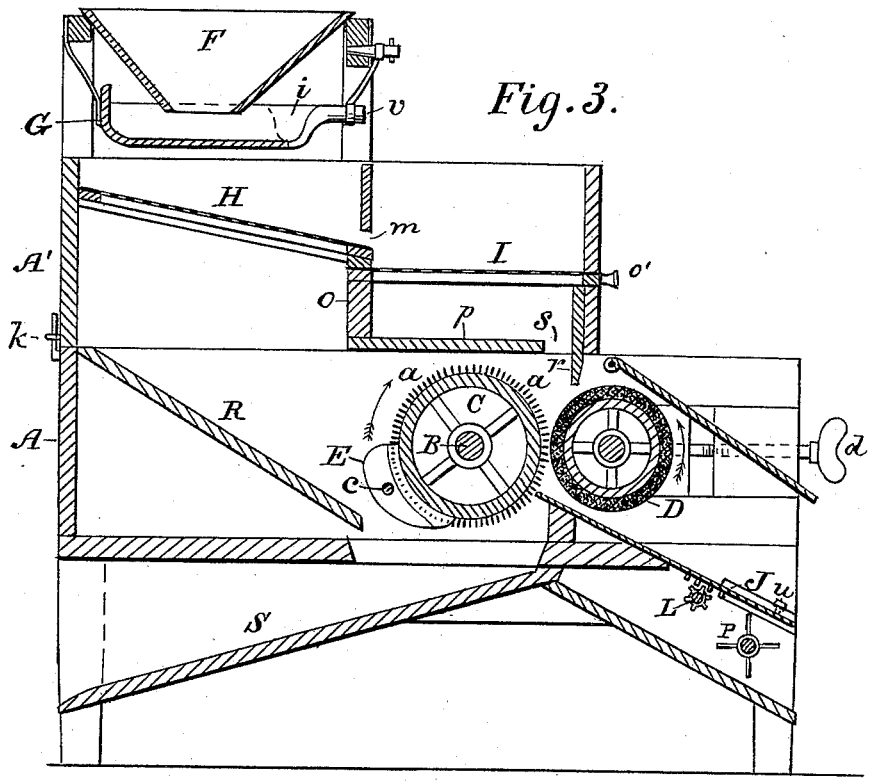
Figure 4:
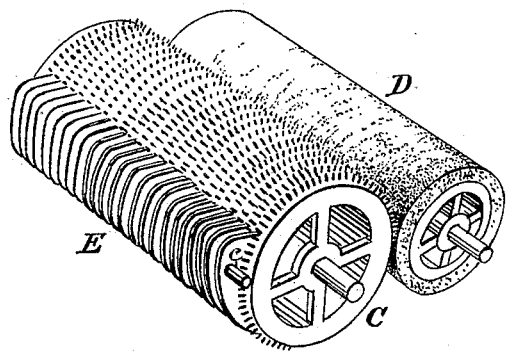

In the accompanying drawings, Figure 1 is a side elevation of a separating-machine having my improvements. Fig. 2 is an end view of the same. Fig. 3 is a vertical longitudinal section. Fig. 4 is a detached view illustrating the toothed cylinder and clearing-comb.

A designates the main frame of the machine.

B indicates a horizontal shaft on which is mounted a rotary cylinder, C, the periphery of which is provided with short fine teeth $a$, which are arranged in rows extending around the cylinder. These teeth are of about the thickness of an ordinary sewing-needle and not more than one-quarter of an inch in length. They are so spaced on the cylinder that about one hundred and ninety-six occupy a square inch, so that they catch and retain any garlic, smut, or soft substances that may be pressed against them during operation, as hereinafter stated. The teeth are arranged in regular rows extending around the cylinder, so that the teeth of the clearing-comb, hereinafter described, may bear against the cylinder between the rows as the cylinder is rotated.

Adjacent to the cylinder C is a roller, D, which has a covering of rubber of sufficient thickness for the purpose hereinafter stated, the said roller being mounted on a shaft and having its periphery close to the teeth of the cylinder C, so that it presses against the said teeth. The shaft of roller D is mounted in movable bearings $b$, placed in openings in the frame A, so that the roller is adjustable toward the cylinder by means of the screws $d$, each of which passes through a threaded nut, $e$, which is fixed in the frame.

E indicates a clearing-comb, which is placed at one side of the cylinder C and having curved teeth, the inner edges of which conform to the said cylinder and fit to the same between the rows of teeth $a$. The teeth of the comb E are sharp at their lower ends and close against the cylinder, so that as the cylinder revolves they remove any garlic or other substances which have been pressed into and retained by the teeth $a$ without crushing the garlic, which might cause the juice from it to get mingled with the wheat. As shown in the drawings, the comb-teeth are perforated and placed on a rod, $c$, the ends of which are fixed to the frame; but the comb may be formed in any suitable manner with the inner edges of the teeth conforming to the surface of the cylinder.

On the top of the frame A is placed a tray, A', which is loosely coupled at one end to the main frame, as seen at $k$. Above the tray A', supported by the main frame, is placed the hopper F. Under the hopper is hung a shoe, G, which is provided with an outlet, $i$, for the passage of grain therefrom when the tray is oscillated, as hereinafter stated. A screen, H, is placed in an inclined position below the shoe G. Another screen, I, which is somewhat coarser than the screen H, is mounted in the frame A' in position to receive the grain which passes from H when frame A' is oscillated, as hereinafter stated. The grain passes from H to I through an opening, $m$, which is made narrow to prevent the grain passing in too large a quantity and to cause the grain to be spread over the screen I. The screen I has fastened to it a vertical clearing-board, $o$, and said screen may be drawn out and returned to its place by means of the handle $o'$, whereby the chaff may be cleared off from the screen and from the floor $p$ below it and thrown into the general passage for the chaff.

J indicates a cut-off chute, which is placed in an inclined position with its upper end close to the teeth $a$ of cylinder C. The plate J is adjustable to or from the cylinder by means of a hand-shaft, L, on which is a pinion which engages with a rack on the under side of the plate J. When adjusted, the plate may be secured in place by means of a set-screw, n.

The cut-off chute J should be accurately adjusted with its edge as close as possible to the teeth a without touching them, so as to catch and take off any grains of wheat which may be carried along by the teeth after they have passed between the cylinder and the rubber roller, and very nearly all the wheat will be received by the plate J and pass down the same.

Motion is imparted to the mechanism through belt-wheel M on the shaft of roller D, and from said shaft to the cylinder C through gear-wheels N N'. An oscillating motion is imparted to frame A', which carries the screens, by means of a bent arm or rod, O, fastened to frame A', the lower end of said arm bearing against the teeth of gear-wheel N, so that during operation every tooth of said wheel causes a slight vibration of the tray A'. A rod, q, has one end pivoted in a slot in a post of the frame, said rod extending inward and resting on the side of the frame A', so that the free end of the rod, which is bent somewhat downward, is in position to strike upward against an arm, v, of the shoe. As the frame A' is vibrated upward, it impinges against the rod and causes its free end to strike the arm of the shoe, thus imparting to the shoe an oscillating movement.

A fan-blower, P, may be placed under the clearing-plate to clear away any chaff which may descend on the clearing-plate.

A fixed guide, r, is to direct the falling wheat between the toothed cylinder and the roller.

As the grain, other seed, and refuse substances mingled fall from the hopper into the shoe G, the latter is oscillated by the arm q, which causes the grain to pass from the shoe through the outlet i of the shoe and fall to the screen H, which allows all particles smaller than the wheat to fall through it to the inclined passage R, from whence it falls to a discharge-chute, S. The wheat and whatever is about the same size, or larger than wheat, passes from the screen H through the opening m to the screen I, such movement being caused by the oscillation of the tray A' by the bent arm O bearing against the teeth of gear-wheel N. The screen I, being somewhat coarser than the screen H, allows the wheat and whatever is about the same size to pass to the bottom or floor p below, from whence it passes through the opening s in said floor to the cylinder C and rubber roller D, and said cylinder and roller being rotated, as indicated by the arrows in Fig. 3, the grain, seed, &c., pass down between them. As the mingled wheat, garlic, and smut pass down between the cylinder and the rubber roller, the garlic and other soft substances are pressed onto the teeth a and more closely to the surface of the cylinder than the wheat, the grains of which are hard and resist the action of the rubber surface and of the teeth and mostly fall to the chute J. Such grains of wheat, however, as are carried along by the teeth a are caught by the edge of the plate J and are taken off and pass down the said plate. The garlic, smut, &c., are carried along as the cylinder rotates until they come in contact with the teeth of the clearing-comb, which set close to the surface of the cylinder and remove such adhering substances therefrom, and such refuse matter falls to the discharge-chute S.

As will be seen, the wheat is separated from the refuse matter and is discharged in one direction, and the garlic, smut, &c., are discharged in the opposite direction.

I claim—

1. In a garlic-separator, the combination, with a rotary cylinder provided with teeth on its periphery, which teeth are in rows extending around the cylinder, of an adjacent rubber roller in contact with said cylinder, a clearing-comb the teeth of which extend between the said rows of teeth to the surface of the cylinder, and an adjustable cut-off chute, substantially as and for the purposes described.

2. In a garlic-separator, the combination, with the rotary cylinder provided with teeth which are arranged in rows extending around the cylinder, of an adjacent rubber roller in contact therewith and a clearing-comb which is provided with teeth the inner edges of which are curved and conform to the periphery of the cylinder, substantially as set forth and described.

In testimony whereof I have affixed my signature in presence of two witnesses.

WILLIAM C. AYERS.

Witnesses:
H. A. DANIELS,
M. P CALLAN.